(12) United States Patent
Kodera et al.

(10) Patent No.: US 6,434,370 B1
(45) Date of Patent: Aug. 13, 2002

(54) MOBILE TELEPHONE WITH ARTICULATED FLAP ABOVE THE KEYPAD

(75) Inventors: Kouji Augustin Kodera, Paris (FR); Steve Hugues, Horsham West Sussex; Nigel Newby, London, both of (GB)

(73) Assignee: Mitsubishi Electric France, Nanterre (FR)

( * ) Notice: Subject to any disclaimer, the term of this patent is extended or adjusted under 35 U.S.C. 154(b) by 0 days.

(21) Appl. No.: 09/519,586

(22) Filed: Mar. 6, 2000

(30) Foreign Application Priority Data

Mar. 10, 1999 (FR) ............................................. 99 02967

(51) Int. Cl.⁷ ................................................. H04B 1/38
(52) U.S. Cl. ..................... 455/90; 455/566; 455/569; 455/575; 455/550; 379/433.01; 379/433.06; 379/433.1; 379/433.04
(58) Field of Search ........................ 455/90, 566, 569, 455/550, 575; 379/434, 433.01, 433.04, 433.02, 433.05, 433.06, 433.07, 433.1

(56) References Cited

U.S. PATENT DOCUMENTS

| | | | | |
|---|---|---|---|---|
| 5,257,310 A | * | 10/1993 | Takagi et al. | ................ 379/433 |
| 5,384,844 A | * | 1/1995 | Rydbeck | ...................... 379/433 |
| 5,638,441 A | | 6/1997 | Hattori et al. | |
| 5,742,912 A | * | 4/1998 | Nishiyama et al. | ......... 455/566 |
| 5,907,615 A | * | 5/1999 | Kaschke | ...................... 379/433 |
| 5,923,752 A | * | 7/1999 | McBride et al. | ............. 379/433 |

* cited by examiner

*Primary Examiner*—William Trost
*Assistant Examiner*—Marceau Milord
(74) *Attorney, Agent, or Firm*—Oblon, Spivak, McClelland, Maier & Neustadt, P.C.

(57) ABSTRACT

The invention relates to a mobile telephone, comprising an elongate body (10) fitted with a keypad (18) for information input, a display screen (20), and a flap (30) mounted displaceably between a covering position, in which it lies along the body (10) above the keypad (18), and an unfurled position away from the keypad (18). The mobile telephone comprises means for the selective displaying on the same screen (20), of a digital clock and of an analogue clock and means for switching between the displaying of the digital clock and the displaying of the analogue clock as a function of the position of the flap.

12 Claims, 1 Drawing Sheet

MOBILE TELEPHONE WITH ARTICULATED FLAP ABOVE THE KEYPAD

Figure 1:
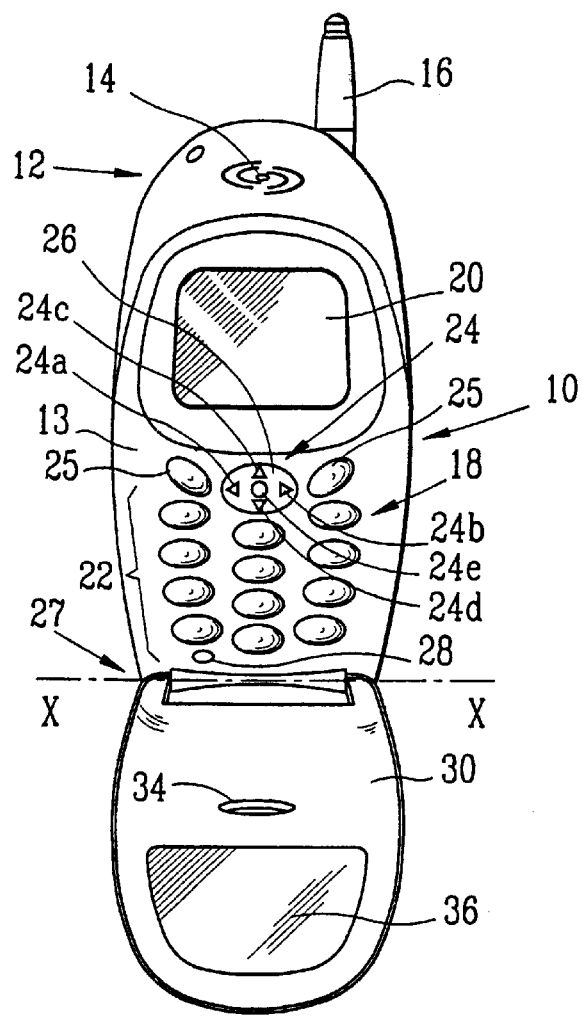

The present invention relates to a mobile telephone, of the type comprising, on the one hand, an elongate body fitted with a keypad for information input and with a display screen, and, on the other hand, a rigid flap mounted displaceably with respect to the body between a covering position, in which it lies along the body above the keypad, and an unfurled position away from the keypad.

A telephone of this type is for example marketed in France under the reference MT30 by the company MITSUBISHI.

The flap forms an articulated cover which covers over the keypad when it is in its folded-down position. It thus ensures protection of the keypad. In particular, it prevents the unintentional depressing of the keys of the keypad when the telephone is in the user's pocket or in a carrying pouch.

When it is in its unfurled position, the flap forms a screen in front of the user's mouth, so as to afford the latter increased comfort and improve the acoustic environment in the vicinity of the microphone which is provided at the base of the body of the telephone in the vicinity of the axis of articulation of the flap.

Mobile telephones comprise a display screen on the face bearing the keypad. This screen is provided opposite the region of articulation of the flap. Under this screen are disposed several keys for access to the main functions of the telephone. These keys allow in particular the reception of a communication and access to electronic messaging.

The flaps of the mobile telephones of the prior art have reduced dimensions. Thus, when the flap is in the folded-down position, it does not cover over either the display screen, or the keys for access to the main functions, so as to allow their use without it being necessary to unfurl the flap.

The present trend is to reduce the proportions of mobile telephones, especially by reducing the length of the body.

Because the display screen and the keys for access to the main functions need to be kept accessible, the reduction in the length of the body leads to the further limiting of the length of the flap. The latter is then no longer able to accomplish its acoustic protection and comfort function during the use of the telephone, since its length is then insufficient for it to lie opposite the mouth.

The objective of the invention is to afford a solution to this problem by making it possible to retain an effective flap even on a mobile telephone of reduced size.

In addition, the size of the display screen is critical for the reduction of the size of the mobile telephones.

The objective of the invention is to provide a mobile telephone, the display screen of which can be reduced but enables the display of a lot of information.

For this purpose, the subject of the invention is a mobile telephone, of the aforesaid type, characterized in that it comprises means for the selective displaying on the same screen, of a digital clock and of an analogue clock, and means for switching between the displaying of the digital clock and the displaying of the analogue clock, the switching means being adapted so as to effect the switching between the displaying of the digital clock and the displaying of the analogue clock as a function of the position of the flap.

According to a particular embodiment, the mobile telephone comprises one or more of the following characteristics:

the keypad comprises a multiple selection device, and the flap comprises an access for controlling the multiple selection device, when the flap is in the covering position;

said control access comprises an access port;

said port is masked by a flexible film;

it comprises an articulation for linking the flap to one end of the body;

the dimensions of the flap are adapted so that, in the covering position, the flap covers all the elements of the keypad, with the exception of the multiple selection device;

the flap comprises a solid wall defining a continuous surface, devoid of any hole other than said port for access to the multiple selection device;

the multiple selection device comprises several directional control elements and at least one enabling element;

the length of the flap in its middle part is greater that half the corresponding length of the body;

the length of the flap in its middle part is between 55 and 85% of the corresponding length of the body;

the display screen is disposed directly in line with the keypad, the dimensions of the flap are adapted so that the flap extends over at least a part of the display screen, when the flap is in the covering position and the flap comprises a transparent window lying above the display screen when the flap is in its covering position; and the surface area of the window is greater that the surface area of the display screen.

Figure 2:
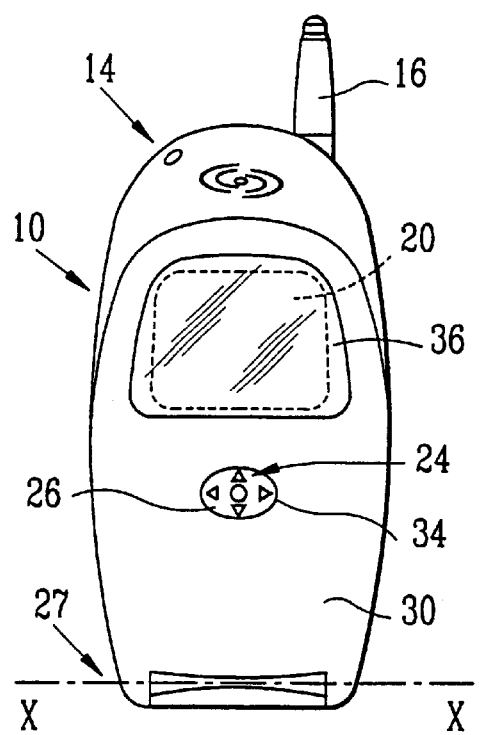

The invention will be better understood on reading the description which follows, given solely by way of example and with reference to the appended drawings in which:

FIG. 1 is an elevational view of a mobile telephone according to the invention with the flap in its unfurled position; and FIG. 2 is a view similar to that of FIG. 1 of the telephone according to the invention with its flap in the folded-down position.

The telephone, represented in FIGS. 1 and 2, is a mobile telephone which can be used on a cellular telephone network.

It comprises a body 10 of elongate shape whose upper end 12 is rounded. At this upper end it has, on its main face 13, a sound restitution aperture 14 intended to be disposed opposite the ear. At its upper end 12, the telephone furthermore comprises an antenna 16.

On its main face 13, the body 10 has a keypad 18 and a display screen 20. The latter is disposed between the keypad 18 and the aperture 14.

The keypad 18 comprises a set 22 of numeric or alphanumeric keys disposed in rows and columns. Between the set of keys 22 and the screen 20 there is provided, along the middle axis of the body, a multiple selection device 24. On either side of the latter are disposed, along a line transverse to the body, two keys 25 for access to specific functions of the telephone, The multiple selection device 24 comprises a single manual selection member 26 permitting a choice between five actions. Externally this selection member 26 has the general shape of an ellipse. It has four directional arrows 24a, 24b, 24c, 24d separated angularly by 90°. At the centre of the arrows is provided an enabling region 24e.

Under each of the marks featuring on the visible face of the selection member 26 is provided a contact linked to the internal circuits of the telephone. These contacts allow detection of the maneuvering of the selection member 26 in the direction of one of the arrows or detection of the depressing of the enabling region.

Thus, the manual selection member 24 constitutes a "joystick" allowing navigation through menus displayed on the screen 20 in the four directions indicated by the arrows 24a to 24d and the enabling of a choice. Navigation and enabling are performed by selective pressing on the left, right, upper, lower or central zones of the exposed face of the selection member 26.

The multiple selection device 24 allows access to the main functions of the mobile telephone, and in particular to the functions which have to be implemented rapidly without resorting to the keys 22 of the keypad. These main functions are for example:

- access to the telephone directory and the initiating of a call with a number from the directory;
- access to the database containing the short messages (SMS); or
- the adjusting of the volume of the ring and the selecting of the corresponding tune.

At the lower end denoted 27 of the body, the mobile telephone comprises a microphone 28 emerging on the main face 13 of the body below the keypad 18.

Furthermore, the telephone comprises a flap 30 articulated at its lower end 27. The flap is articulated about a transverse axis X—X disposed under the microphone 28.

The flap 30 is displaceable between an unfurled position represented in FIG. 1 in which the flap is away from the keypad 18 and a folded-down or covering position, represented in FIG. 2, in which the flap lies along the body above the keypad 18 and at least partly above the screen 20. In its unfurled position, the flap 30 defines an angle of around 150° with the main face 13 of the body. It then constitutes a phonic screen.

The flap 30 has a length measured in its middle part greater than half the total length of the body 10. In particular, this length is advantageously between 55 and 85% of the total length of the body.

In the embodiment represented, the flap completely covers over the keypad 18 and the display screen 20.

The outer contour of the flap corresponds substantially to that of the main face of the body 10, the latter being however shorter so as to leave the aperture 14 free when the former is in the folded-down position.

According to the invention, the flap 30 consists of a solid panel having a single port 34 whose dimensions and shape correspond to those of the manual selection member 26.

The port 34 is positioned on the flap, as represented in FIG. 2 so as to constitute an access to the multiple selection device 24 when the flap is in the folded-down position. In this Bositon, the port 34 reveals the selection member 26.

Furthermore, the flap comprises a transparent window 36 provided In the region of the latter covering over the screen when it is in its folded-down position. The window 36 is formed by a flap region consisting of a transparent material.

In the embodiment represented, the transparent region of the flap stretches beyond the surface of the screen.

It is understood that the presence of the port 34 makes it possible to access the multiple selection device 24 even when the flap 30 is in its folded-down position covering the keypad 18.

Thus, the main functions of the telephone remain accessible.

The presence of the port 34 allows the flap 30 to have a substantial length despite the small length of the body 10. In particular, the length of the flap 30 according to the invention is much greater than the length of the zone occupied by the set of keys 22.

By grouping the main functions of the telephone together on one multiple selection device, it is possible for just one hole to be made in the flap 30.

Thus, despite the presence of the port 34, the flap can accomplish its protection role improving the acoustic environment and comfort of the user.

There being only one port 34, its presence only very slightly affects the mechanical strength of the flap 30, so that the latter can be made simply and inexpensively.

As a variant (not represented) the port 34 is masked by a transparent flexible film or one on which is inscribed the information allowing control of the multiple selection device 24.

The port masked by the flexible film forms an access for controlling the device 24. Thus, it is always possible to manoeuvre the device 24 even when the flap is folded-down.

The presence of -he flexible film improves the protection of the front face of the telephone against dust.

Moreover, it is understood that the presence of the transparent window 36 allows the user to utilize information displayed on the screen even when the flap is folded down, whilst also guaranteeing that the length of the flap is sufficient to accomplish a role of acoustic protection and comfort, even if the mobile telephone has small dimensions.

As a variant (not represented) the flap 30 is slideably displaceable with respect to the body and not articulated to the latter.

Moreover, the telephone advantageously comprises a position sensor for the flap disposed near the articulation hinge. This sensor is for example formed of an electric contact carried by the body of the telephone, the flap comprising a stud for actuating the electric contact when the flap is in its covering position.

This sensor is linked to the main control circuit of the telephone.

The latter is adapted to display, over the bulk of the surface of the display screen 20, an analogue clock, that is to say a typically circular dial bearing twelve graduations and two rotary hands whose position with respect to the dial is representative of the time.

The main circuit is also adapted to display on a reduced part of the screen 20, a digital clock, that is to say digital information consisting of at least two numbers, one corresponding to the hours and the other to the minutes.

Advantageously, means are provided for switching between two modes of displaying the time, one displaying the analogue clock and the other the digital clock, as a function in particular of the flap's position as detected by the sensor.

In particular, when the flap is in its covering position, the analogue clock is then displayed. Conversely, when the flap is in its unfurled position, the digital clock is displayed. The digital clock is then associated on the screen with other information such as the nature of the network used and/or the number called.

When the telephone is not being used and the flap is in the covering position an easily accessible time cue of large size is made available to the telephone bearer. Conversely, when using the telephone, the flap being open, only a reduced part of the screen is occupied by the digital clock, freeing some of the surface on the screen for other useful information.

As a variant, the switching between the two modes of clock display can be controlled by other actions, in particular the depressing of a sequence of keys which is predefined from the keypad.

What is claimed is:

1. A mobile telephone comprising:

an elongate body fitted with a keypad for information input and with a display screen;

a rigid flap mounted movably with respect to the body between a covering position in which the flap lies along the body above the keypad and an unfurled position away from the keypad;

means for selectively displaying on the screen a digital clock and an analog clock; and means for switching between the displaying of the digital clock and the displaying of the analog clock as a function of the position of the flap.

2. The mobile telephone of claim 1, wherein:

the keypad includes a multiple selection device; and the flap comprises an access for controlling the multiple selection device when the flap is in the covering position.

3. The mobile telephone of claim 2, wherein:

said control access includes an access port.

4. The mobile telephone of claim 3, wherein:

said port is masked by a flexible film.

5. The mobile telephone of any of the preceding claims, further comprising:

an articulation for linking the flap to one end of the body.

6. The mobile telephone of claim 2, wherein:

in the covering position, the flap covers all elements of the keypad with the exception of the multiple selection device.

7. The mobile telephone of claim 3, wherein:

the flap includes a solid wall defining a continuous surface, devoid of any hole other than said port for access to the multiple selection device.

8. The mobile telephone of claim 2, wherein:

the multiple selection device includes several directional control elements and at least one enabling element.

9. The mobile telephone of claim 1, wherein:

the flap in its middle part is longer than half a corresponding length of the body.

10. The mobile telephone of claim 9, wherein:

a length of the flap in its middle part is between 55 and 85% of a corresponding length of the body.

11. The mobile telephone of claim 1, wherein:

the display screen is disposed directly in line with the keypad so that the flap extends over at least a part of the display screen when the flap is in the covering position; and the flap includes a transparent window lying above the display screen when the flap is in its covering position.

12. The mobile telephone of claim 11, wherein:

a surface area of the window is greater than a surface area of the display screen.

\* \* \* \* \*